US012423110B2

(12) United States Patent
Revuri et al.

(10) Patent No.: US 12,423,110 B2
(45) Date of Patent: Sep. 23, 2025

(54) DYNAMIC RECOMMENDATIONS FOR FASTER ISSUE IDENTIFICATION AND RESOLUTION

(71) Applicant: Dell Products L.P., Round Rock, TX (US)

(72) Inventors: Chandrasekhar Revuri, Bangalore (IN); A Anis Ahmed, Bangalore (IN); Pallavi Satpathy, Bhubaneswar (IN)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 17/873,724

(22) Filed: Jul. 26, 2022

(65) Prior Publication Data

US 2024/0036873 A1 Feb. 1, 2024

(51) Int. Cl.
G06F 11/00 (2006.01)
G06F 9/38 (2018.01)
G06F 11/07 (2006.01)

(52) U.S. Cl.
CPC ........ G06F 9/3842 (2013.01); G06F 11/0793 (2013.01)

(58) Field of Classification Search
CPC ..... G06F 11/0793; G06F 9/453; G06F 9/3842
USPC ....................................... 714/1–57
See application file for complete search history.

(56) References Cited

U.S. PATENT DOCUMENTS

| | | | | |
|---|---|---|---|---|
| 7,818,274 B1* | 10/2010 | Ottamalika | ......... | H04L 41/0681 706/45 |
| 8,166,244 B2* | 4/2012 | Fruchter | ................. | G06F 9/452 718/1 |
| 2002/0120886 A1* | 8/2002 | Nguyen | ................ | G06F 11/328 714/39 |
| 2004/0153875 A1* | 8/2004 | Amyot | ............. | H04M 3/42153 714/47.3 |
| 2005/0262393 A1* | 11/2005 | King | ....................... | H04L 43/10 714/13 |
| 2007/0226170 A1* | 9/2007 | Sun | ........................ | G06Q 50/18 |
| 2010/0083029 A1* | 4/2010 | Erickson | ............... | G06F 11/079 714/2 |
| 2010/0318855 A1* | 12/2010 | Beg | ..................... | H04L 41/0604 714/39 |
| 2011/0296237 A1* | 12/2011 | Mandagere | ........... | G06F 11/079 714/E11.029 |
| 2013/0080514 A1* | 3/2013 | Gupta | ..................... | G06F 9/451 709/203 |
| 2014/0344788 A1* | 11/2014 | Rhoads | ............... | G06F 11/3692 717/126 |
| 2018/0314958 A1* | 11/2018 | Sethi | ........................ | G06N 5/02 |
| 2021/0124672 A1* | 4/2021 | Abdelhalim | .......... | G06F 11/327 |
| 2021/0397495 A1* | 12/2021 | Prakash | ................ | G06F 11/008 |
| 2022/0091923 A1* | 3/2022 | O'Toole | .................. | G06N 7/01 |

(Continued)

*Primary Examiner* — Sarai E Butler
(74) *Attorney, Agent, or Firm* — Jackson Walker L.L.P.

(57) ABSTRACT

An information handling system may include at least one processor and a memory. The information handling system may be configured to: receive an instruction from a user; cause the instruction to be executed, wherein executing the instruction generates a response; parse the response to determine whether any failures are associated therewith; and provide a recommended instruction to the user, wherein the recommended instruction is executable to locate and/or remediate an issue associated with the information handling system.

14 Claims, 2 Drawing Sheets

(56) References Cited

U.S. PATENT DOCUMENTS

2022/0188431 A1\* 6/2022 Parameshwaran ...... G06F 9/547
2023/0018199 A1\* 1/2023 Mahamuni .......... G06F 11/3051

\* cited by examiner

DYNAMIC RECOMMENDATIONS FOR FASTER ISSUE IDENTIFICATION AND RESOLUTION

TECHNICAL FIELD

The present disclosure relates in general to information handling systems, and more particularly to providing dynamic recommendations in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Administrators often use various types of tools or interfaces for monitoring, managing, deploying, and configuring information handling systems locally or remotely. However, there are various challenges associated with existing tools.

In particular, existing tools do not provide recommendations (e.g., recommended commands or actions) dynamically based on the current context or state of the system. For example, an administrator may perform some health check on a system and receive a result that its health status is "critical" in some respect. However, existing tooling may not be able to provide recommendations on commands to execute to obtain component-level health information to identify the impacted component(s), carry out remediations, etc. The ability to recommend further subcomponents to check or commands to use to identify the cause of the issues would drastically improve the time needed to resolve the issue, but existing tooling does not provide such functionality.

It would be advantageous for tools to be able recommend a course of action dynamically. Embodiments of this disclosure may provide such capabilities.

Some embodiments of this disclosure may employ artificial intelligence (AI) techniques such as machine learning, deep learning, natural language processing (NLP), etc. Generally speaking, machine learning encompasses a branch of data science that emphasizes methods for enabling information handling systems to construct analytic models that use algorithms that learn interactively from data. It is noted that, although disclosed subject matter may be illustrated and/or described in the context of a particular AI paradigm, such a system, method, architecture, or application is not limited to those particular techniques and may encompass one or more other AI solutions.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with recommendations in information handling systems may be reduced or eliminated.

In accordance with embodiments of the present disclosure, an information handling system may include at least one processor and a memory. The information handling system may be configured to: receive an instruction from a user; cause the instruction to be executed, wherein executing the instruction generates a response; parse the response to determine whether any failures are associated therewith; and provide a recommended instruction to the user, wherein the recommended instruction is executable to locate and/or remediate an issue associated with the information handling system. In accordance with these and other embodiments of the present disclosure, a method may include an information handling system receiving an instruction from a user; the information handling system causing the instruction to be executed, wherein executing the instruction generates a response; the information handling system parsing the response to determine whether any failures are associated therewith; and the information handling system providing a recommended instruction to the user, wherein the recommended instruction is executable to locate and/or remediate an issue associated with the information handling system.

In accordance with these and other embodiments of the present disclosure, an article of manufacture may include a non-transitory, computer-readable medium having computer-executable code thereon that is executable by a processor of an information handling system for: receiving an instruction from a user; causing the instruction to be executed, wherein executing the instruction generates a response; parsing the response to determine whether any failures are associated therewith; and providing a recommended instruction to the user, wherein the recommended instruction is executable to locate and/or remediate an issue associated with the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
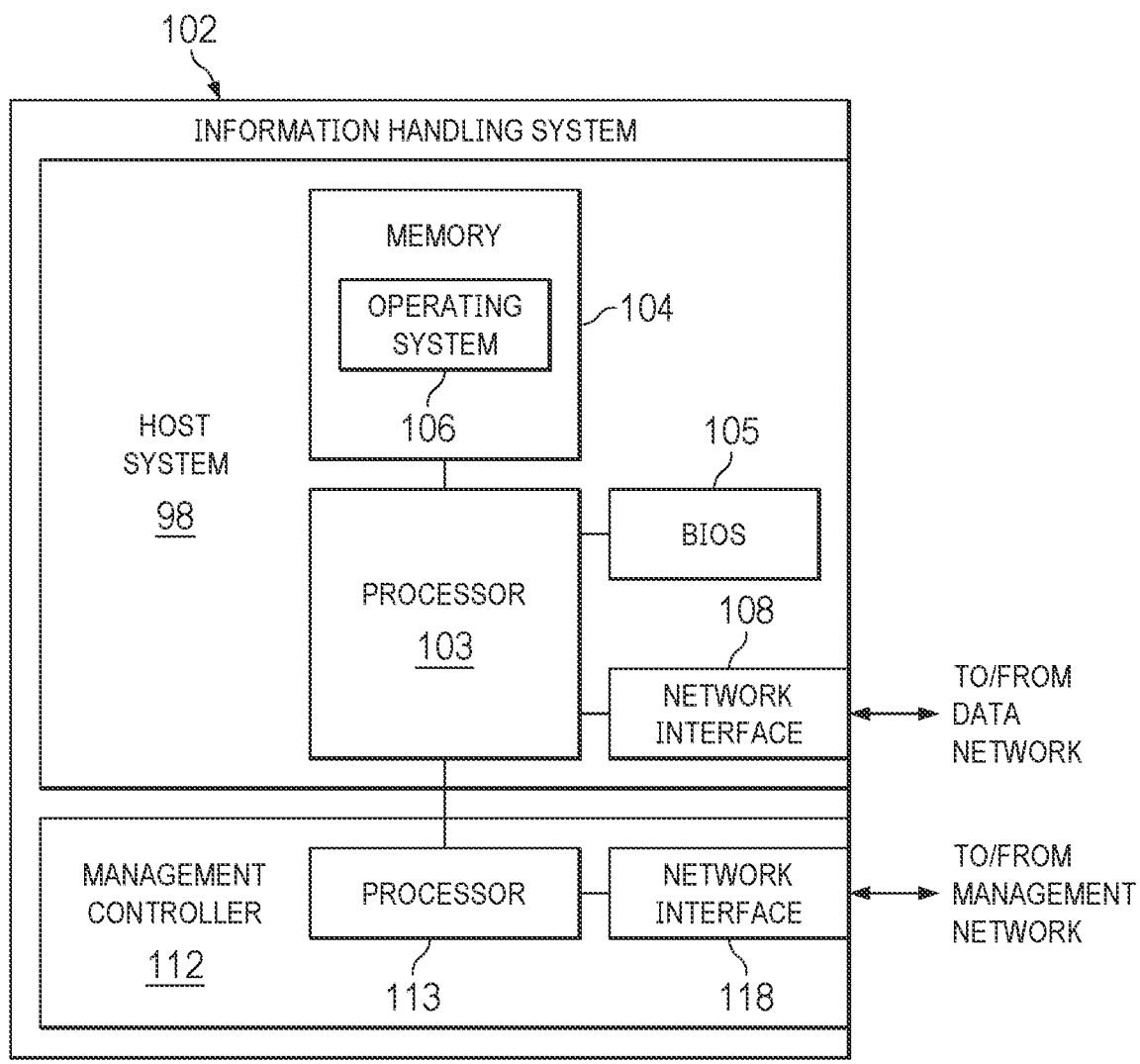
FIG. 1 illustrates a block diagram of an example information handling system, in accordance with embodiments of the present disclosure.
Figure 2:
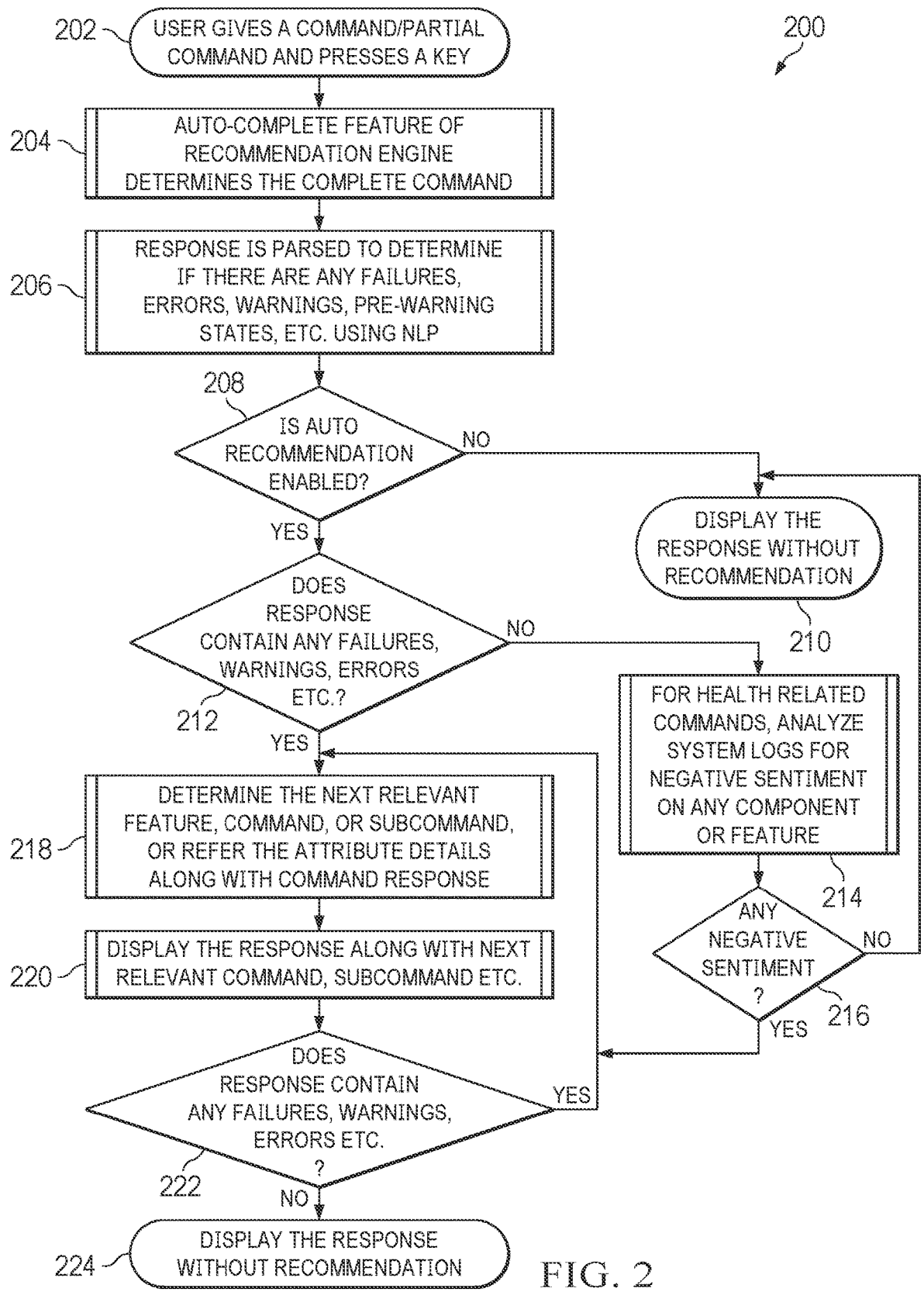
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "couple-able" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives, solid-state drives, and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide dynamic recommendations to a user (e.g., an administrator) of information handling system 102. For example, some embodiments may operate by parsing system logs and recommending commands or actions to remediate any problems that may be discovered.

Additionally, some embodiments may operate by providing recommendations based on prior usage and frequency data. For example, if a user frequently performs some particular action (e.g., fetching and installing an update from an FTP repository through a proxy server), existing solutions may require the user to remember and type the full command and all of its required arguments every time. Embodiments of this disclosure may dynamically recommend the command and its arguments based on a prior frequency of usage and context information for the current user.

Some embodiments may operate by taking into account the context of other information handling systems in the same environment or network. For example, if a datacenter administrator wants to configure all the servers in a network using the same update file and same configuration parameters, a dynamic recommendation may supply the syntax for a command line operation to carry out that configuration. The dynamic recommendation may automatically recommend parameters for such an operation based on the patterns in the values for the same command on other systems in that network (e.g., customizing the command based on the individual hostnames, network addresses, and/or other characteristics of each information handling system that executes the command).

As another example, a particular network may include System A and System B. An error on System A may be resolved by an administrator using one or more commands. When the same error is detected on System B, a dynamic recommendation may be provided to resolve the error based on the prior operations of System A.

Turning now to FIG. 2, an example method 200 is shown for providing dynamic recommendations, according to some embodiments. In particular, method 200 depicts a set of high-level steps that may be performed by a recommendation engine in assessing a command and a response, as well as dynamically determining further relevant commands or subcommands to execute, as well as determining additional attributes which may be helpful in identifying and resolving an issue. As discussed below, if a given command or subcommand generates a response that has no failures or warnings, then the recommendation engine may analyze system-level components and/or device-level details to determine if there are any failures or warnings associated with other devices, components, or subcomponents in the system. A corresponding component-specific command recommendation may then be provided to the user.

In this embodiment, at step 202, a user may type a complete command or may type a partial command and press a specified key (e.g., tab) to perform auto-completion. At step 204, the command auto-completion is determined if necessary, and the command is executed. A response (e.g., a return value and/or a console message, etc.) may then be returned.

At step 206, the response may be parsed to determine if it includes any failures, errors, warnings, pre-warning info, or the like (collectively referred to herein as "failures"). In some embodiments, this parsing and determination may be carried out with NLP-based engine rules.

In one embodiment, a user preference may be set to determine whether or not auto-recommendations are desired. If the auto-recommendation preference is disabled at step 208, then at step 210, the response may be displayed as normal without any recommendations.

If there are any failures present in the response at step 212, then at step 218, the method may proceed to determine the next relevant feature, command, or subcommand to display along with response. The same recommendation process may be repeated at steps 220 and 222 until no further features, commands, or subcommands remain.

If there are no failures in the response and the command is related to health, then at step 214 the method may check the system logs for any feature, component, and/or device reported to be in an unhealthy state (e.g., having failures, warnings, potential failures, etc.). If any such negative sentiment is detected at step 216, then the method may proceed to step 218 and proceed as discussed above.

If there are no failures in the command response or in the system logs, then the response may be displayed without any recommendation at step 210.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

For the sake of clarity and concreteness, further specific examples of functionality enabled according to this disclosure are described below.

In one scenario, a user may be using a command-line tool for interacting with management controller 112. For example, a command-line tool such as "racadm" may be used in this example. The user attempts to execute a command with unsupported options, and so a recommendation engine may suggest an alternative that can be run on the current interface.

For example, the user may attempt to run the command "racadm license import -f License.xml -c idrac.embedded.1", and a response may be returned as "ERROR: The specified option is not supported with the interface being used."

The recommendation engine determines (e.g., based on NLP techniques) that this response contains a failure. The recommendation engine may further determine the correct command to suggest based on the error output and other system parameters. Accordingly, the recommendation engine may use an NLP engine to determine the next command to suggest based on keywords in the error output, as well as keywords provided in the manual page or help of the command that was called, and/or other commands that are available via this interface. The recommendation engine then determines the closes matching command as "racadm license import -u admin -p passwd -f <license file XML> -l //<BMC IP Address>/licshare -c idrac.embedded.1". Finally, in addition to displaying the returned error message, the recommendation engine may provide this command as a suggestion.

In some embodiments, recommendations may be tailored based on the specific user that is interacting with the system. For example, if a non-root (or non-administrator) user encounters an error, the recommendation engine may determine a suggested command, but may also determine that the suggested command is only usable by a root user. The recommendation engine may then notify the user that additional privileges are needed to carry out the recommendation. In these and other embodiments, the recommendation engine may suggest the recommendation directly to the root user (e.g., by sending an alert or an email, logging the recommendation into a system log, etc.).

In another scenario, a user may attempt to check the health of a system using a Redfish interface by performing "GET/redfish/v1/Chassis/<Server X>/StorageHealthStatus", and the response may be returned indicating that the health is "Critical".

The recommendation engine may then parse this response, detect the negative sentiment in the response, and recommend the next level of sub-command to be executed for further remediation, such as "GET/redfish/v1/Chassis/<Server X>/StorageHealthStatus/HardDiskHealth". The response to this command (if the user chooses to proceed) may indicate that a particular RAID controller is in a critical state.

The recommendation engine may then parse this second response, detect the negative sentiment, and recommend a further level of sub-command to be executed for further remediation, such as "GET/redfish/v1/Chassis/<Server X>/StoargeHealthStatus/RAID.SL.8-1". The response to this command may show that a particular physical disk and/or virtual disk are in unhealthy states, and the recommendation engine may then proceed to suggest further commands for identifying and correcting the problem.

In another scenario, recommendations may be made based on the frequency of commands previously executed within the information handling system and/or the network environment of the information handling system. For example, a datacenter administrator may frequently perform an update on multiple servers in the same network from an FTP repository through a proxy server using same command with the same configuration, such as "racadm update -f Catalog.xml -e 192.168.11.10/Repo/MyCatalog -a TRUE -ph 145.140.12.56 -pu prxyuser -pp prxypass -po 80 -pt http -t FTP".

After this command has been executed one or more times, the recommendation engine may automatically begin recommending it when the administrator begins typing the beginning of the command. For example, the administrator may type "racadm update <tab>", and the recommendation engine may fill in the rest of the command. In these and other embodiments, the recommendation engine may also be configured to customize the command for the specific information handling system (e.g., by detecting that certain options are different in each invocation and are specific to the individual information handling system).

In yet another scenario, a command's response may not include any errors, but some other component may nevertheless be in a faulty state. For example, a user may run a command such as "racadm getsensorinfo", and the command response may be returned providing various items of sensor information, none of which indicate a fault. Nevertheless, an analysis of system logs may detect negative sentiment associated with a disk in a faulty state. The recommendation engine may thus recommend a command such as "racadm get pdisks" in order to extract further information.

Thus embodiments may provide recommended commands based on any of various factors, allowing faster identification and resolution of issues.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   receive an instruction from a user;
   cause the instruction to be executed, wherein executing the instruction generates a response;
   parse the response to determine whether any failures are associated therewith;
   in response to a determination that a failure has occurred, determine that a different information handling system has previously experienced the same failure;
   determine one or more commands that were used to correct the failure at the different information handling system; and
   provide a recommended instruction to the user based on the determined one or more commands, wherein the recommended instruction is executable via a command-line interface to locate and/or remediate an issue associated with the information handling system;
   wherein, based on a determination that no failure is associated with the response, the information handling system is further configured to parse a system log to provide the recommended instruction.

2. The information handling system of claim 1, wherein the instruction is executable by a management controller of the information handling system.

3. The information handling system of claim 1, wherein, based on a determination that the user lacks sufficient privileges to execute the recommended instruction, the information handling system is configured to transmit the recommended instruction to a different user having sufficient privileges.

4. The information handling system of claim 1, wherein the recommended instruction is determined based on prior instructions that have been received from the user.

5. A method comprising:
   an information handling system receiving an instruction from a user;
   the information handling system causing the instruction to be executed, wherein executing the instruction generates a response;
   the information handling system parsing the response to determine whether any failures are associated therewith;
   in response to a determination that a failure has occurred, the information handling system determining that a different information handling system has previously experienced the same failure;
   the information handling system determining one or more commands that were used to correct the failure at the different information handling system; and
   the information handling system providing a recommended instruction to the user based on the determined one or more commands, wherein the recommended instruction is executable via a command-line interface to locate and/or remediate an issue associated with the information handling system;
   wherein, based on a determination that no failure is associated with the response, the information handling system is further configured to parse a system log to provide the recommended instruction.

6. The method of claim 5, wherein the parsing is based on natural language processing (NLP).

7. The method of claim 5, wherein the recommended instruction is determined based on prior instructions that have been received from the user.

8. The method of claim 7, wherein at least one of the prior instructions was received at a different information handling system.

9. The method of claim 8, wherein the recommended instruction includes at least one portion that differs from the at least one prior instruction and is customized based on the information handling system.

10. The method of claim 5, wherein the received instruction comprises a partial instruction and an autocomplete indication, and wherein the method includes performing autocompletion on the partial instruction.

11. An article of manufacture comprising a non-transitory, computer-readable medium having computer-executable code thereon that is executable by a processor of an information handling system for:
    receiving an instruction from a user;
    causing the instruction to be executed, wherein executing the instruction generates a response;
    parsing the response to determine whether any failures are associated therewith;
    in response to a determination that a failure has occurred, determining that a different information handling system has previously experienced the same failure;
    determining one or more commands that were used to correct the failure at the different information handling system; and
    providing a recommended instruction to the user based on the determined one or more commands, wherein the recommended instruction is executable via a command-line interface to locate and/or remediate an issue associated with the information handling system;
    wherein, based on a determination that no failure is associated with the response, the information handling system is further configured to parse a system log to provide the recommended instruction.

12. The article of claim 11, wherein the instruction is executable by a management controller of the information handling system.

13. The article of claim 11, wherein, based on a determination that the user lacks sufficient privileges to execute the recommended instruction, the information handling system is configured to transmit the recommended instruction to a different user having sufficient privileges.

14. The article of claim 11, wherein the recommended instruction is determined based on prior instructions that have been received from the user.

\* \* \* \* \*